United States Patent [19]

Kimura

[11] Patent Number: 4,531,206
[45] Date of Patent: Jul. 23, 1985

[54] METHOD AND APPARATUS FOR DETECTING TRACKING ERROR

[75] Inventor: Kenji Kimura, Tachikawa, Japan

[73] Assignee: Olympus Optical Co., Ltd., Japan

[21] Appl. No.: 365,310

[22] Filed: Apr. 5, 1982

[30] Foreign Application Priority Data

Apr. 10, 1981 [JP] Japan .................................. 56-53119

[51] Int. Cl.³ .......................... G11B 21/02; H04N 5/76
[52] U.S. Cl. ...................................................... 369/44
[58] Field of Search .................................. 369/43-46; 250/201, 202; 358/342

[56] References Cited

U.S. PATENT DOCUMENTS 4,118,735 10/1978 Wilkinson ............................ 369/44
4,232,201 11/1980 Canino .................................. 369/44
4,310,911 1/1982 Fujishima ......................... 369/44 X Primary Examiner—Robert L. Richardson
Attorney, Agent, or Firm—Parkhurst & Oliff

[57] ABSTRACT

An optical disc player including an automatic tracking control for causing a light spot projected on a rotating optical disc to trace spiral or concentric information tracks is disclosed. A tracking error is detected by a wobbling method in which the light spot is vibrated in accordance with a position modulating signal having a given frequency, an amplitude modulated component due to a positional modulation is derived from a reproduced RF signal by passing an envelope signal of the reproduced signal through a band pass filter having a center frequency equal to the frequency of the position modulating signal, a sampling pulse is produced in synchronism with the position modulating signal and the amplitude modulated signal is sampled by the sampling pulse to derive a tracking error. A phase difference between the amplitude modulating signal and the sampling pulse is detected and a phase of the sampling pulse is modulated in accordance with the detected phase difference in such a manner that the amplitude modulated component can be always sampled at its peak points.

10 Claims, 14 Drawing Figures

METHOD AND APPARATUS FOR DETECTING TRACKING ERROR

BACKGROUND OF THE INVENTION

The present invention relates generally to a technique for reproducing an information signal recorded on an optical disc along spiral or concentric tracks, and more particularly to a method for detecting a tracking error signal representing a deviation of a light spot on the disc with respect to the information track in a disc radial direction.

In an optical disc player, in order to reproduce a recorded information signal accurately, information tracks should be traced by a light spot precisely. For this purpose there have been proposed several methods for detecting the tracking error. One of the methods is called a wobbling method, in which the light spot on the disc is vibrated in the radial direction by a small distance in accordance with a position modulating signal having a given frequency and in which an amplitude modulated component contained in a reproduced RF signal due to the vibration is sampled by a sampling signal which is synchronised with the position modulating signal to obtain a tracking error signal. In this wobbling method, the light spot is moved periodically in the disc radial direction by a swingable mirror arranged in an optical path between a light source and an objective lens. For instance, the mirror is provided on electromechanical means such as an electrostrictive element to which is supplied the position modulating signal having the given frequency and the mirror is vibrated in accordance the modulation signal. In the known method the sampling pulse is fixed in phase with respect to the position modulating signal. In general, the sampling pulse is produced at a peak point of the amplitude modulated component. Therefore, if there is produced a drift or fluctuation of the electrostrictive element and its driving circuit due to temperature variation, secular variation, etc., there might be produced undesired phase difference between the sampling signal and the amplitude modulated component. That is to say, the sampling pulse is not always coincident with the peak point of the amplitude modulated component. Therefore, it is difficult to detect the tracking error precisely, so that the tracking control could not be effected accurately.

SUMMARY OF THE INVENTION

The present invention has for its object to provide a novel and useful method for detecting a tracking error in an accurate manner without being affected by drift or fluctuation of an electromechanical device for vibrating a beam spot on an optical disc, a driving circuit therefor, etc. due to temperature variation and secular variation.

According to the invention, in a method for detecting a tracking error representing a deviation of a light spot projected upon a rotating optical disc with respect to spiral or concentric information tracks recorded in the optical disc, wherein the light spot is vibrated on the optical disc in a disc radial direction in accordance with a position modulating signal and an amplitude modulated component contained in a reproduced RF signal due to the positional modulation of the light spot is sampled by a sampling signal synchronized with the position modulating signal, the improvement comprises:

detecting a phase difference between the sampling signal and the amplitude modulated component; and modulating a phase of the sampling signal in accordance with the detected phase difference in such a manner that the amplitude modulated component is sampled by the sampling signal at a same phase position.

The present invention also relates to an apparatus for detecting a tracking error in an optical disc player and has an object to provide a novel and useful apparatus which can detect a tracking error signal having a large amplitude in an accurate and precise manner without being influenced by any fluctuation and variation of circuit portions and an electromechanical device for vibrating a beam spot on an optical disc.

According to the invention, in an apparatus for detecting a tracking error representing a deviation of a light spot projected upon a rotating optical disc with respect to spiral or concentric information tracks recorded in the optical disc wherein the apparatus includes means for generating a position modulating signal having a given frequency, means for vibrating the light spot on the optical disc in its radial direction in accordance with said position modulating signal, means for deriving an amplitude modulated component in a reproduced signal due to the positional modulation of the light spot, means for generating a sampling signal in synchronism with the position modulating signal, and means for sampling the amplitude modulated component by means of said sampling signal to detect the tracking error, the improvement comprises:

means for detecting a phase of the amplitude modulated component;

means for detecting a phase difference between the detected phase of the amplitude modulated component and the sampling signal; and means for modulating the phase of the sampling signal with the detected phase difference in such a manner that the amplitude modulated component is sampled at its peak points.

DESCRIPTION OF THE PREFERRED EMBODIMENTS

Figure 1:
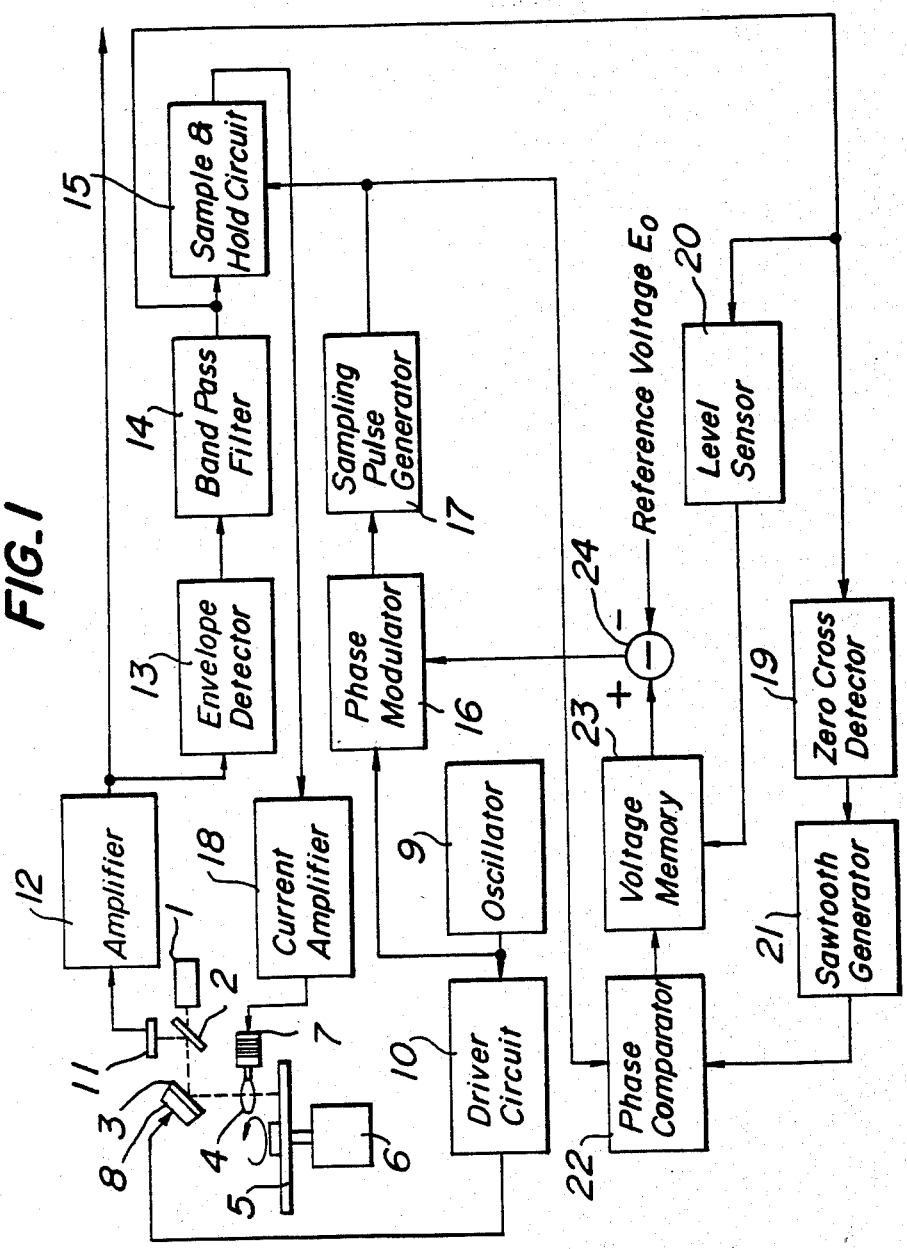
FIG. 1 is a block diagram showing an embodiment of an optical disc player for carrying out the tracking error detecting method according to the invention.

FIG. 1 is a block diagram showing an embodiment of an optical disc player to which the tracking error detecting method according to the invention is applied. A light beam emitted from a laser light source 1 is transmitted through a half mirror 2 and is projected upon an optical disc 5 by means of a reflection mirror 3 and an objective lens 4. The disc 5 is rotated by a motor 6 at a given constant speed such as 1,800 rpm. The objective lens 4 is movably supported by a tracking mechanism 7 in a tracking direction perpendicular to an optical axis of the objective lens 4 as well as to a track direction. The reflection mirror is secured to an electrostrictive element 8 such as bimorph and the element 8 is driven by a position modulating signal of a given frequency supplied from an oscillator 9 via a driving circuit 10. Therefore, the mirror 3 swings to modulate the incident angle of the light beam and the light spot on the disc 5 is vibrated in the tracking direction perpendicular to the information track direction.

The light reflected from the disc 5 is collected by the objective lens 4 and is made incident upon a light detector 11 by means of the mirror 3 and half mirror 2. An output signal from the light detector 11 is amplified by a voltage amplifier 12 to produce a reproduced RF signal. The reproduced RF signal is supplied to an envelope detector 13 to detect an amplitude modulated component due to the positional modulation of the beam spot. The detected amplitude modulated component is supplied to a sample and hold circuit 15 via a band pass filter 14 for transmitting a part of the positional modulated signal component having a given frequency.

The position modulating signal, i.e. the wobbling signal from the oscillator 9 is also supplied to a phase modulator 16 and a triggering pulse having an optimum phase is derived from the phase modulator 16. A sampling pulse generator 17 is triggered by the triggering pulse to produce a sampling signal which is then supplied to the sample and hold circuit 17. In the sample and hold circuit 17, the amplitude modulated component is sampled to produce a tracking error signal. The tracking error signal thus produced is supplied through a current amplifier 18 to the tracking mechanism 7 to move the light spot on the disc 5 in its radial direction. In this manner the tracking control can be carried out.

Figure 2A:
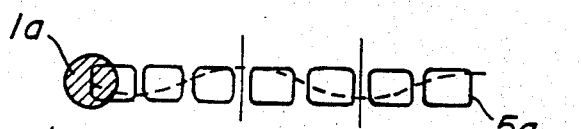
FIGS. 2A, 2B and 2C are schematic views illustrating positions of a beam spot with respect to an information track.
Figure 2B:
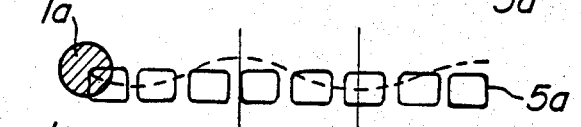
Figure 2C:
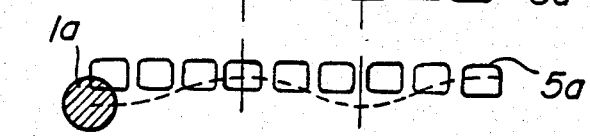
Figure 3A:
FIGS. 3A, 3B and 3C are signal waveforms of an amplitude modulated component which is detected in the conditions shown in FIGS. 2A, 2B and 2C, respectively.

FIGS. 2A, 2B and 2C show schematically how to modulate the beam spot position with respect to the information track. FIG. 2A illustrates an ideal tracking condition in which a center of the light spot 1a is vibrated symmetrically on both sides of a center of the track 5a. In this case, the amplitude modulated component in the envelope signal detected by the envelope detector 13 has a frequency which is equal to twice of the wobbling frequency as shown in FIG. 3A.

Figure 3B:
Figure 3C:
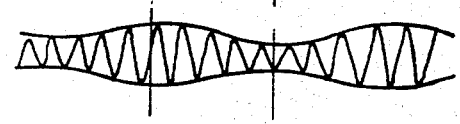

FIGS. 2B and 2C illustrate out-of tracking conditions in which the center of the beam spot 1a is shifted in the radial direction outwardly and inwardly, respectively. Then the amplitude modulated signals have a frequency equal to the wobbling frequency and an amplitude, i.e. peak value proportional to the deviation as shown in FIGS. 3B and 3C. It should be noted that the polarity of the amplitude modulated signal becomes opposite in dependence upon a direction of the tracking error.

As explained above, the band pass filter 14 is provided for selecting the amplitude modulated component having the wobbling frequency and therefore, in the ideal tracking condition shown in FIG. 2A, the amplitude modulated component is not transmitted through the filter. Contrary to this, in the out-of tracking conditions illustrated in FIGS. 2B and 2C, the amplitude modulation component having the wobbling frequency is passed through the filter 14. In the present embodiment, the wobbling frequency is set to 31.5 KHz and thus the band pass filter 14 has a center frequency of 31.5 KHz.

Figure 4A:
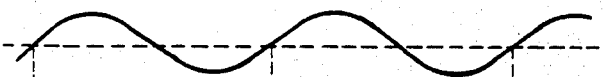
FIGS. 4A to 4F are signal waveforms for explaining the operation of the tracking error detecting method according to the invention.
Figure 4B:
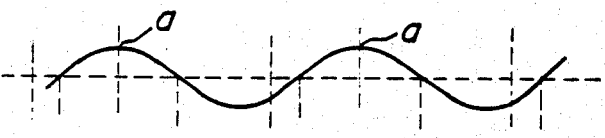
Figure 4C:
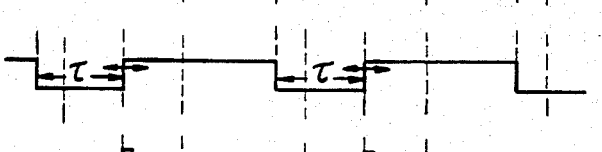
Figure 4D:
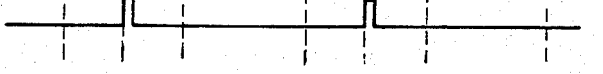

FIGS. 4A to 4F show waveforms of signals appearing at various points in the circuit shown in FIG. 1. FIG. 4A illustrates a wobbling signal generated from the oscillator 9, FIG. 4B the amplitude modulated component transmitted through the filter 14 in case of the out-of tracking condition, FIG. 4C an output triggering signal from the phase modulator 16 and FIG. 4D depicts the sampling pulse supplied from the sampling pulse generator 17.

In the known method, the phase modulator 16 is so constructed that an output is set to a low level in response to a positive going zero crossing of the wobbling signal and after a given delay time $\tau$, the output is changed to a high level and the sampling pulse generator 17 is triggered by a raising edge of the output of the phase modulator 16. In other words in the known method, the sampling pulse is generated at a fixed time relative to the amplitude modulated component. However, in practice, the amplitude modulated component is subjected to drift of the electrostrictive element 8, the driving circuit 10, etc. due to temperature variation and secular variation. Therefore, in the known method it could not be ensured that the amplitude modulated component is always sampled at its peak value. Therefore, a precision of the detection might be decreased and the tracking control could not be effected in an accurate and stable manner.

According to the invention, the phase of the amplitude modulated component and that of the sampling signal are always compared with each other and the delay time $\tau$ of the phase modulator 16 is automatically adjusted to such a value that the sampling signal is always produced at a same phase position, i.e. peak point of the amplitude modulated signal. In this manner, the amplitude modulated component can be always sampled at its maximum value point a and thus the tracking error signal can be obtained with a very high detection sensitivity.

Figure 4E:
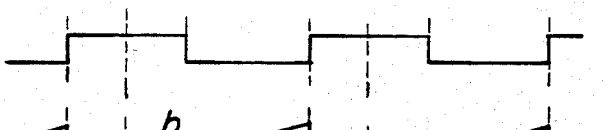
Figure 4F:
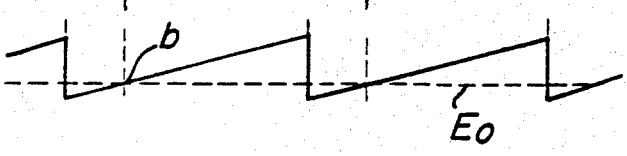

According to the present embodiment, as illustrated in FIG. 1, the amplitude modulated signal from the band pass filter 14 is supplied to a zero cross detector 19 and to a level sensor 20. In the zero cross detector 19, a zero cross signal shown in FIG. 4E is produced and a sawtooth signal generator 21 is triggered at a raising edge of the zero cross signal to produce a sawtooth signal illustrated in FIG. 4F. The sawtooth voltage signal thus produced is applied to a phase comparator 22 including a sample and hold circuit to which is also supplied as a sampling signal the sampling pulse shown in FIG. 4D from the sampling pulse generator 17. Then an instantaneous value of the sawtooth voltage signal is sampled and held. The voltage thus sampled is stored in a voltage memory circuit 23 to which is also supplied an output signal from the level sensor 20. The integrated signal in the memory circuit 23 is applied to one input of a subtractor 24 to the other input of which is applied a reference voltage $E_o$. The reference voltage $E_o$ is determined to such a value that when there is no phase deviation between the amplitude modulated signal and the sampling signal, the sawtooth voltage reaches the level $E_o$ as illustrated in FIG. 4F at a point b. Therefore, when the sampling pulse is produced too fast, the sawtooth voltage is sampled at a lower level, but when the sampling pulse is generated too late, the sampled value of the sawtooth voltage exceeds the reference voltage $E_o$. A difference voltage from the subtractor 24 is applied to the phase modulator 16 to adjust the delay time $\tau$ as shown by double headed arrows. Then, the phase of the triggering signal to be supplied to the sampling pulse generator 17 is modified in such a manner that when the voltage stored in the memory circuit 23 is lower than the reference voltage $E_o$, the delay time $\tau$ of the phase modulator 16 is prolonged, and when the voltage stored in the memory circuit 23 is higher than the reference voltage $E_o$, the delay time $\tau$ is shortened. In this manner, there is formed a negative feedback loop for maintaining the phase of the sampling pulse at the peak points of the amplitude modulated signal and thus, the tracking error detection can be effected always in a correct phase and an accurate tracking control can be carried out.

Figure 5:
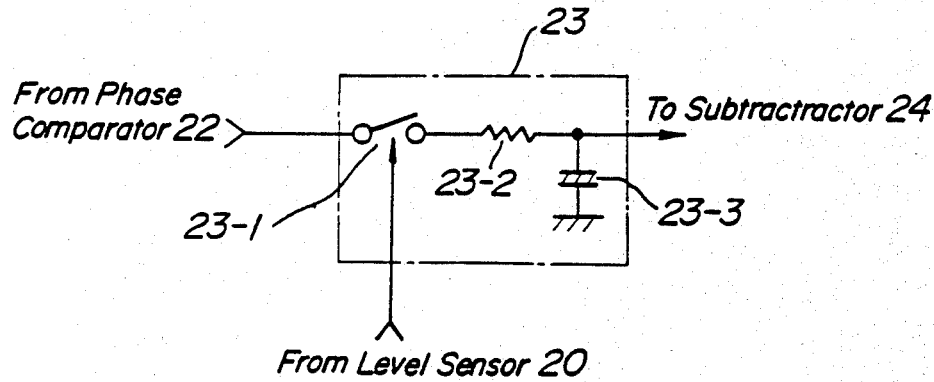
FIG. 5 is a circuit diagram illustrating an embodiment of a voltage memory circuit provided in the tracking error detecting apparatus shown in FIG. 1.

FIG. 5 shows an embodiment of the voltage memory circuit 23. The memory circuit comprises a switch 23-1 actuated by an output signal from the level sensor 20, and an integrating circuit consisting of a resistor 23-2 and a capacitor 23-3. The level sensor 20 compares the output signal from the band pass filter 14 with a given standard level, and the switch 23-1 is turned ON, when the output from the band pass filter 14 exceeds the standard level. During the time that switch 23-1 is turned ON, the voltage sampled by the phase comparator 22 is stored in the integrating circuit. Whereas, when the output of the band pass filter 14 is lower than the standard level, i.e. in the ideal tracking condition, the switch 23-1 is turned OFF and the voltage which has been just stored in the capacitance 23-3 is applied to the subtractor 24. In this manner, the feedback loop is made operative only when the tracking error is produced and thus, the tracking control can be effected very stably.

The present invention is not limited to the embodiments explained above, but may be modified in various manner within the scope of the invention. In the above embodiment, the phase modulator is provided between the wobbling oscillator 9 and the sampling pulse generator 17, but it may be provided after the sampling pulse generator. In an initial condition for reproducing the disc 5, the automatic tracking control loop may be disconnected between the sample and hold circuit 15 and the current amplifier 18, and after detecting the optimum phase, the automatic tracking control loop may be connected into the circuit. It is also evident that the optical disc may be of a transmitting type instead of reflecting type.

As explained above in detail, according to the invention the phase difference between the amplitude modulated component due to the wobbling modulation and the wobbling modulation signal is detected and the phase of the sampling signal is automatically adjusted in accordance with the detected phase difference. Therefore, the amplitude modulated component can be sampled or detected always at its peak points and thus, the tracking error signal can be obtained in an accurate and stable manner.

What is claimed is:

1. In a method for detecting a tracking error produced by the deviation of a light beam projected upon a rotating optical disc with respect to spiral or concentric information tracks recorded in the optical disc, wherein the light beam is caused to vibrate on the optical disc in a disc radial direction by a first signal and wherein a second signal derived from light projected on said disc is sampled at a predetermined phase position of said second signal by a sampling signal synchronized with said first signal to obtain a tracking error signal, the improvement in said method of detecting a tracking error comprising:

detecting a phase difference between the sampling signal and the second signal; and changing the phase of the sampling signal in response to said detected phase difference to maintain a predetermined phase relationship between said sampling signal and said second signal.

2. The method of claim 1 wherein said first signal contains peaks and said changing steps comprises changing the phase of the sampling signal so that the sampling signal is coincident with said peaks of the second signal.

3. The method of claim 1 wherein said second signal is an amplitude modulated signal derived by detecting the envelope of a signal produced by the projected light on said disc and further comprising band pass filtering said second signal with a band pass filter having a center frequency equal to the frequency of said first signal.

4. In an apparatus for detecting a tracking error representing a deviation of a light beam projected upon a rotating optical disc with respect to spiral or concentric information tracks recorded in the optical disc wherein the apparatus includes means for projecting a light beam upon the optical disc, means for generating a position modulating signal having a given frequency, means responsive to said position modulating signal for vibrating the light beam on the optical disc in a radial direction of the disc, means responsive to light projected upon said disc by said light beam for deriving an amplitude modulated signal caused by said vibrating light beam, means for generating a sampling signal synchronized with said position modulating signal, and means responsive to said sampling signal for sampling said amplitude modulated signal to produce a tracking error signal, said amplitude modulated signal having peaks and said amplitude modulated signal and said sampling signal having a predetermined phase relationship, the improvement in said apparatus comprising:

means for detecting a phase of the amplitude modulated signal;

means responsive to said detected phase of said amplitude modulated signal for detecting a difference in the phase relationship of said amplitude modulated signal and said sampling signal from said predetermined relationship;

and means responsive to said detected phase difference for changing the phase of the sampling signal with respect to the phase of said amplitude modulated signal to maintain said predetermined phase relationship such that said amplitude modulated signal is sampled at said peaks.

5. The apparatus of claim 13 wherein said means for detecting the phase of said amplitude modulated signal comprises a zero crossing detector for detecting zero crossings of said amplitude modulated signal.

6. The apparatus of claim 5 wherein said means for detecting the phase difference comprises a sawtooth signal generator constructed and arranged to be responsive to said zero crossing detector for producing a sawtooth signal, and a phase comparator coupled to receive said sawtooth signal and said sampling signal and produce a sampled output of said sawtooth signal in response to said sampling signal.

7. The apparatus of claim 6 wherein said means for detecting the phase difference further comprises a memory circuit coupled to receive and store said sample sawtooth signal, means for providing a reference signal, and a subtractor coupled to subtract said reference signal from said sampled sawtooth signal to produce a difference signal.

8. The apparatus of claim 7 wherein said means for detecting said phase difference further comprises a level sensor coupled to compare said amplitude modulated signal with a signal representing a predetermined level to produce an error signal and wherein said memory circuit includes switch means responsive to said error signal for causing a storage of said sampled sawtooth signal.

9. The apparatus of claim 7 wherein said reference signal is equal to the value of said sampled sawtooth signal when there is no phase difference between said amplitude modulated signal and said sampling signal.

10. In an apparatus for detecting a tracking error representing a deviation of a light beam projected upon a recording medium with respect to an information track recorded in said medium wherein the apparatus includes means for projecting a light beam upon the medium, means for generating a position modulating signal having a given frequency, means responsive to said position modulating signal for vibrating the light beam across said information track, means responsive to light projected upon said track by said light beam for deriving an amplitude modulated signal caused by said vibrating light beam, means for generating a sampling signal synchronized with said position modulating signal, and means responsive to said sampling signal for sampling said amplitude modulated signal to produce a tracking error signal, said amplitude modulated signal and said sampling signal having a predetermined phase relationship, the improvement in said apparatus comprising:

means for detecting a phase of the amplitude modulated signal;

means responsive to said detected phase of said amplitude modulated signal for detecting a difference in the phase relationship of said amplitude modulated signal and said sampling signal from said predetermined relationship;

and means responsive to said detected phase difference for changing the phase of the sampling signal with respect to the phase of said amplitude modulated signal to maintain said predetermined phase relationship.

* * * * *